May 23, 1961  W. H. FISHER ET AL  2,985,740
MANUAL CONTROL UNITS

Filed March 12, 1959  2 Sheets-Sheet 1

INVENTORS
WILLIAM HAWARDEN FISHER
KENNETH LANDER
BY Kirschstein, Frischstein & Ottinger
ATTORNEYS

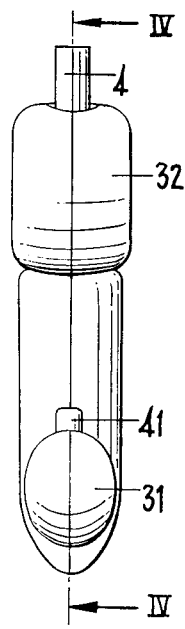
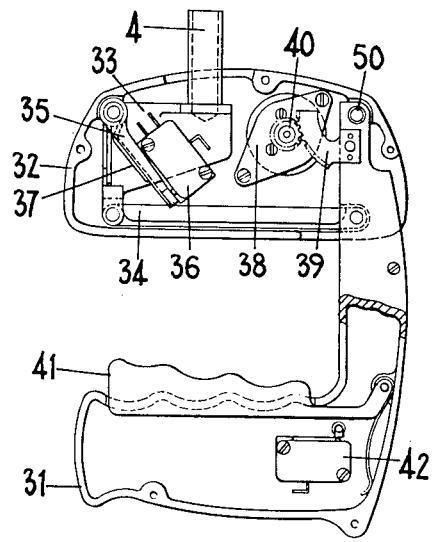
Fig. 3
Fig. 4
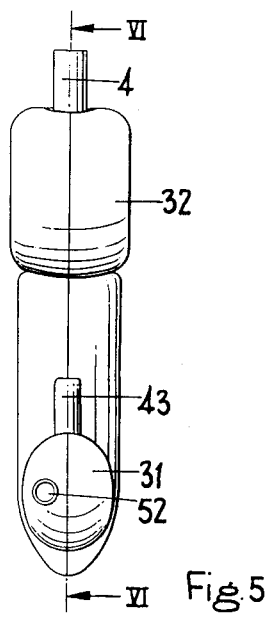
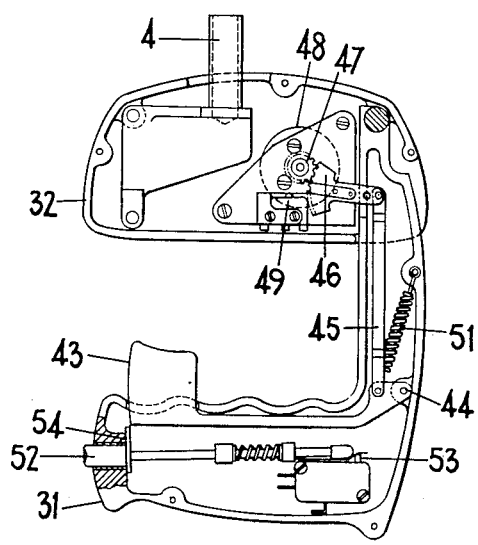
Fig. 5
Fig. 6
INVENTORS
WILLIAM HAWARDEN FISHER
KENNETH LANDER
ATTORNEYS even# United States Patent Office 2,985,740
Patented May 23, 1961

2,985,740

MANUAL CONTROL UNITS

William Hawarden Fisher, Manchester, and Kenneth Lander, Sale, England, assignors to The General Electric Company Limited, London, England Filed Mar. 12, 1959, Ser. No. 798,967

Claims priority, application Great Britain Mar. 13, 1958

13 Claims. (Cl. 200—157)

This invention relates to manual control units for the control of remotely operated handling devices. Such devices and the control units therefor are required for use in circumstances in which the control device is inaccessible to a human operator without risk to that operator.

The object of the present invention is to provide a control unit which can translate the movement of an operator's hand into electrical signals operating the control device through some form of servo mechanism.

According to the present invention a manual control unit for the control of a remotely operated handling device comprises in combination a portion adapted to be gripped manually carried by a shaft which is mounted for universal pivotal movement and for rotational movement about its axis centralising means and electrical pick-up means being associated with each of all possible movements of the said shaft whereby movement from a predetermined centralised position can cause a corresponding change in an electrical circuit both to signal direction and magnitude of such movement.

In a preferred arrangement in accordance with the invention the portion adapted to be gripped manually is also capable of a limited range of movement from a centralised or neutral position relative to the shaft on which it is mounted and such movement can also correspondingly be signalled to effect a corresponding control of the remotely controlled device.

In yet another arrangement in accordance with the invention the portion adapted to be gripped manually can be provided with switch means adapted to be operated by pressure of an operator's thumb.

Generally speaking two such control units will be provided one for each hand of the operator. It will be appreciated that separate motions of a single unit that can be signalled are respectively:

(1) Movement of a hand from side to side which will hereafter be called horizontal movement;

(2) Movement of a hand up or down hereafter called vertical movement;

(3) Rotation of a hand anti-clockwise and clockwise, hereafter called rotational movement;

(4) In and out movement of a hand (caused by movement of the gripped portion relative to the shaft); and (5) Operation of the trigger in a pistol grip.

In order that the principle of the invention may be understood, one arrangement in accordance with the invention will now briefly be described by way of example.

In this arrangement the control unit comprises a hollow main shaft supported from a mounting panel through a gimbal bearing coned member housing a self aligning bearing through which the hollow main shaft passes, the shaft being capable of rotational movement about its axis.

One end of the shaft carries a portion adapted to be gripped by the hand of an operator and on that side of the cone bearing remote from the manual grip are mounted two gimbal bridge members which follow the movement of the shaft in any vertical or horizontal direction.

Each of the gimbal bridges carries a gear sector which meshes with a corresponding pinion driving the shaft of a potentiometer, stepped rotary switch, or inductive servo input device, also carried from the mounting panel.

At the end of the control shaft remote from the grip is mounted a further gear sector meshing with the corresponding pinion on a similar electrical pick-up device which is operated by rotation of the shaft.

Limit stops are provided to limit each of the possible movements of the control shaft so that over travel of the electrical pick-up device is prevented.

For each movement available to the control shaft there is provided means for determining a centralised or neutral position. The means are generally similar and comprise an arm extending between a pair of actuator arms biassed one towards the other by a coil spring and so arranged that any movement of the control arm away from the neutral position engages one or other of the switch actuator arms and increases the tension of the return spring so that on release by cooperation of the actuator arms and the arm on the control shaft the control shaft is moved to a predetermined centralised position, that is to say its neutral position.

Preferably also the actuator arm can be utilised to operate associated electrical switching means.

The portion at the end of the control arm can be a simple pistol grip arrangement rigidly fixed thereto.

Preferably however the pistol grip is arranged so that the actual grip is capable of limited movement, again from a centralised or neutral position relative to the control shaft.

Thus for example the pistol grip can be constituted by two hollow castings pivoted together and one being pivotally mounted on a bracket carried by the end of the control shaft and enclosing a link attached at one end to the bracket and at the other end to the second casting.

It will be appreciated that there is thus formed a parallelogram made by the link and the first casting which form the long side and the pivot bracket and part of the pistol grip second casting which form the short side.

There is thus provided a limited amount of movement between the grip and the control shaft which movement is again detected by means of a gear sector engaging with a pinion mounted on a suitable electrical pick-up means.

Finally the grip is provided with a thumb operated trigger switch.

The invention will now be described in greater detail with reference to the accompanying drawings in which:

Figure 3 is a plan view of one construction of manually gripped portion forming part of the control unit shown in Figure 1;

Figure 4 is a section on line IV—IV in Figure 3;

Figure 5 is a plan view of a modified manually gripped portion; and

Figure 6 is a section on line VI—VI in Figure 5.

Figure 1:
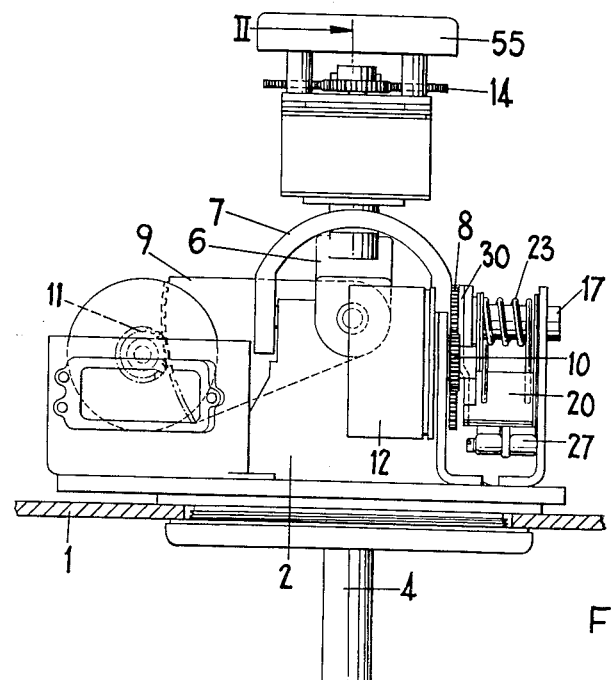
Figure 1 is a plan view of a control unit.
Figure 2:
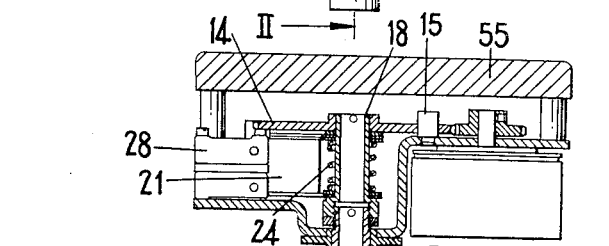
Figure 2 is a section on line II—II in Figure 1.
Figure 2:
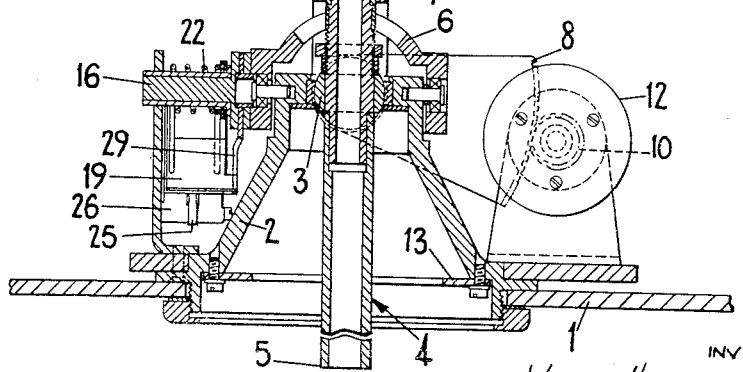

Referring to Figures 1 and 2, each control unit is mounted on a mounting panel 1 which supports a gimbal bearing cone 2. This cone houses a self aligning bearing 3 at its apex, through which passes a hollow shaft 4. A manually gripped portion, such as that shown in Figures 3 and 4, or Figures 5 and 6, is adapted to be rigidly connected to the end 5 of the shaft 4. Connected to the shaft 4 are two pairs of gimbal bridge castings 6 and 7 which are adapted to follow the movement of the shaft in any vertical or horizontal direction. Gear sectors 8 and 9 are attached respectively to the gimbal bridge castings 6 and 7 and in turn engage with pinions 10 and 11 on a potentiometer or a stepped rotary switch 12 such that there is magnification of rotary motion to enable the full 360° range of the potentiometer or switch to be used. The rotational motion of the shaft can have a maximum range between 30° and 180° but it is found that a range of 100° causes least fatigue to the operator during operation. This rotational motion is again magnified by means of a sector and pinion arrangement on a potentiometer.

Mechanical limit stops are provided to prevent overtravel of the potentiometer or rotary switches; for movement of the shaft 4 in the vertical or horizontal directions the limit stop takes the form of a gate 13 in the path of travel of the shaft and is fixed to the mouth of the gimbal cone 2. For preventing over travel during rotational motion a stop is placed in the path of travel of a gear sector 14, the stop consisting of an annular slot cut in the gear sector through which a peg 15 projects.

The centralizing means for the shaft 4 will now be described. From the rotational centre of each of the gear sectors 8, 9 and 14 a shaft 16, 17 or 18 is brought out, around each of which shafts are pivoted a pair of switch actuator arms 19, 20 or 21 which are sprung together by powerful coil springs 22, 23 and 24 respectively.

Attached to a bracket 25 mounted on a non-moving portion of the unit are a pair of micro-switches 26, these micro-switches being mounted in such a way that the ends of the actuator arm 19 can depress the switch plungers when the shaft 4 is in the central position. Further pairs of micro switches 27 and 28 are similarly mounted with respect to the actuator arms 20 and 21. Pickups 29 and 30 to the actuator arms 19 and 20 from the shaft 4 are again centred at the rotational centre and fixed rigidly thereto. It will therefore be seen that any movement of the shaft 4 away from its central position will move a pick up arm which immediately engages one of the associated switch actuator arms and moves it away from the associated switch, at the same time increasing the tension of the associated return spring. As the actuator arm moves the micro switch the appropriate electrical circuit is energised and the respective potentiometer becomes operative. When the shaft is released, however, then the return spring acts upon the pick up arm via the switch actuator arm and so returns the shaft to the central position.

Movement of the control shaft vertically horizontally or about its axis is effected by means of the portion shown in Figures 3 and 4 which is adapted to be mounted rigidly at the end of the shaft. This portion is adapted also to effect a longitudinal movement relative to the shaft in the manner now to be described.

Thus referring to Figures 3 and 4 this portion is constructed of cast shells which are made in aluminum for lightness, and consists essentially of a pistol grip type handle 31 and a switch case 32, the latter being suspended from a pivot bracket 33. The switch case 32 forms one link of a parallelogram, another link 34 being pivoted from the pivot bracket 33 and fixed by bearings in the handle 31.

Bearings are arranged around the top forward pivot in the pivot bracket and on each side is fitted a micro switch actuator arm 35 which is held against a micro switch 36 by a strong spring 37. On the inside of the switch case there is a projection so placed that it engages with the actuator arm 35 so that any movement of the case will be spring controlled and returned; this mechanism is repeated at the opposite side of the switch case and hence a definite neutral position, in which the two micro switches are deenergised, is ensured. A potentiometer 38 is rigidly fixed to one side of the switch case and relative angular movement between the handle 31 and the switch case is utilised for driving this potentiometer via a gear sector 39 fixed to the handle and meshing with a pinion 40 on the shaft of the potentiometer. The handle houses a spring loaded trigger 41 which is set to operate a micro switch 42 mounted inside the handle and adapted to operate additional circuits as may be necessary. The wiring from the handle portion is taken through the pivot bracket and out along the inside of the hollow shaft 4. An alternative construction of manually gripped portion will now be described with reference to Figures 5 and 6. Referring to these figures, the portion comprises as before a pistol grip type handle 31 and a switch casing 32, these parts being rigidly connected together. The handle 31 houses a trigger 43 which is pivoted at 44 and connected by a linkage bar 45 to a pivoted gear sector 46, this gear sector engaging a pinion 47 for driving a potentiometer 48. A miniature micro switch 49 is used to ensure cut out at the end of travel. The handle 31 forms one link of a parallel link mechanism, the linkage bar 45 forming the other link. The linkage bar 45 is biassed to return the trigger to its neutral position by a return spring 51.

Also fitted in the handle is a press button 52 which is arranged to operate a micro switch 53; a mechanical interlock device 54 is fitted between the press button 52 and the trigger to ensure that neither one of the two can be operated at any one time.

It will be seen from the above description that the unit is adapted for smooth and easy operation. The unit is balanced by means of a counter weight 55 to facilitate its handling.

Moreover by virtue of the return springs associated with the pairs of actuator arms increased movement of the control shaft in any sense meets an increasing reaction tending to restore the shaft to its central position; thus the risk of over shooting a desired position is greatly reduced.

The invention may be modified in various ways without departing from the scope of the invention. According to one modification, each of the potentiometers is replaced by a plurality of microswitches which are adapted to be closed or opened successively by switch actuator arms rigidly connected to a link, the link moving longitudinally by an amount proportional to the displacement of the central shaft.

We claim:

1. A manual control unit for the control of a remotely operated handling device, comprising a shaft mounted for universal pivotal movement and for rotational movement about its axis, said shaft having a neutral position, a manually operated member mounted at one end of said shaft, a parallel link mechanism connecting said member to said shaft and permitting movement of the member in a direction parallel to the shaft, said member having a neutral position with respect to the shaft, means for producing an electrical signal corresponding in sign and magnitude to each said movement of said shaft and said member from their respective neutral positions, and an electrical pick-up associated with each said movement for operating said means.

2. A manual control unit for the control of a remotely operated handling device, comprising a gimbal bearing housing a self aligning bearing, said gimbal bearing being mounted on a panel, a shaft mounted in said gimbal bearing for universal pivotal movement and for rotational movement about its axis, said shaft having a neutral position, a manually operated member mounted at one end of said shaft, a parallel link mechanism connecting said member to said shaft and permitting movement of the member in a direction parallel to the shaft, said member having a neutral position with respect to the shaft, means for producing an electrical signal corresponding in sign and magnitude to each said movement of said shaft and said member from their respective neutral positions, and an electrical pick-up associated with each said movement for operating said means.

3. A manual control unit for the control of a remotely operated handling device, comprising a shaft mounted for universal pivotal movement and for rotational movement about its axis, said shaft having a neutral position, a manually operated member mounted at one end of said shaft, a parallel link mechanism connecting said member to said shaft and permitting movement of the member in a direction parallel to the shaft, said member having a neutral position with respect to the shaft, spring means for detecting any movement of said shaft from its neutral position and producing a reaction biasing the shaft to said neutral position, means for producing an electrical signal corresponding in sign and magnitude to each said movement of said shaft and said member from their respective neutral positions, and an electrical pick-up associated with each said movement for operating said means.

4. A manual control unit for the control of a remotely operated handling device, comprising a shaft mounted for universal pivotal movement and for rotational movement about its axis, said shaft having a neutral position, a pivot bracket mounted at one end of said shaft, a pair of parallel links depending from said pivot bracket, a pistol grip type handle connected to said bracket through said links, said handle being capable of movement in a direction parallel to said shaft and having a neutral position with respect to said shaft, a spring biasing said handle into its neutral position, means for producing an electrical signal corresponding in sign and magnitude to each said movement of said shaft and said handle from their respective neutral positions, and an electrical pick-up associated with each said movement for operating said means.

5. A manual control unit according to claim 4 wherein one of said links comprises a casing housing said pivot bracket and the other said link, the casing having a pair of apertures through which said shaft and said handle respectively extend.

6. In a manual control unit according to claim 5, the improvement comprising a pair of microswitches mounted one on each side of said pivot bracket, a pair of switch actuator arms pivotally mounted on said pivot bracket and engaging respectively said microswitches, means carried by one of said links for effecting movement of one or other of said switch actuator arms in accordance with movement of said links, and spring means biasing said switch actuator arms against such movement whereby to bias said handle towards its neutral position.

7. In a manual control unit according to claim 6, the improvement comprising a further microswitch for operating an electrical circuit, said further microswitch being mounted on said handle, and a spring-loaded trigger carried by said handle for operating said further microswitch.

8. A manual control unit for the control of a remotely operated handling device, comprising a shaft mounted for universal pivotal movement and for rotational movement about its axis, said shaft having a neutral position, means for producing an electrical signal corresponding in sign and magnitude to any movement of said shaft from its neutral position, and electrical pick-up associated with each said movement for operating said means, a casing mounted at one end of said shaft, a manually operated trigger pivotally mounted in said casing and connected thereto by a parallel link mechanism permitting movement of the trigger in a direction parallel to said shaft, said trigger having a neutral position with respect to said shaft, a spring biasing said trigger towards its neutral position, electrical signal producing means mounted within said casing, and gear mechanism for operating said electrical signal producing means, said parallel link mechanism comprising a first link constituted by said casing and a second link housed within said casing and connecting said trigger to said gear mechanism.

9. In a manual control unit according to claim 8, the improvement comprising a microswitch for operating an electrical circuit, said microswitch being mounted within said casing, and a spring loaded press button for operating said microswitch.

10. In a manual control unit according to claim 9, the improvement comprising a mechanical interlock fitted between said trigger and said press button for preventing their being operated at the same time.

11. A manual control unit for the control of a remotely operated handling device, comprising a shaft mounted for universal pivotal movement and for rotational movement about its axis, said shaft having a neutral position, means for producing an electrical signal corresponding in sign and magnitude to each said movement of said shaft from its neutral position, an electrical pick-up associated with each said movement for operating said means, a casing mounted at one end of said shaft, a manually operated member pivotally connected to said casing, electrical signal producing means housed within said casing, mechanism within said casing for operating said electrical signal producing means, and a linkage bar connecting said manually operated member to said mechanism for actuating said mechanism in accordance with any movement of said member.

12. A manual control unit for the control of a remotely operated handling device, comprising a shaft, means mounting the shaft for rotation about its own axis and for rotation about two intersecting orthogonal axes intersecting the longitudinal axis of the shaft, whereby the shaft can experience universal pivotal movement about said point of intersection as well as rotary movement about its own axis, a manually operable member, means mounting said member on one end of said shaft for movement with said shaft as said shaft experiences rotary and universal pivotal movement and for movement relative to said shaft in a direction having a component parallel to the axis of said shaft, whereby said member may be manipulated to move the shaft for universal pivotal movement and for rotational movement and to itself move relative to the shaft in a direction parallel to the axis of the shaft, said shaft having a reference position, said member having a reference position relative to said shaft, means for producing an electrical signal corresponding in sign and magnitude to each movement of the shaft and member from their respective reference positions, and an electrical pick-up associated with each said movement for operating said electric signal producing means.

13. A unit as set forth in claim 12, wherein there further is provided a second member, means mounting the second member on the first member for movement relative thereto, and an electric switch controlled by the second member.

References Cited in the file of this patent
UNITED STATES PATENTS
2,861,699    Youmans _____ Nov. 25, 1958